(12) United States Patent
Wang et al.

(10) Patent No.: US 10,941,538 B2
(45) Date of Patent: Mar. 9, 2021

(54) HAMMERING SYSTEM WITH ELECTROMAGNETIC POWER FOR DYNAMIC PILE TESTING

(71) Applicants: Hohhot Sifang Engineering Quality Testing Center, Hohhot (CN); Tianjin In-situ Geophysical Scientific Co., Ltd, Tianjin (CN)

(72) Inventors: Xiangping Wang, Hohhot (CN); Quansheng Guo, Hohhot (CN); Xing Ji, Hohhot (CN); Yonggang Fu, Hohhot (CN); Liang Han, Tianjin (CN)

( * ) Notice: Subject to any disclaimer, the term of this patent is extended or adjusted under 35 U.S.C. 154(b) by 218 days.

(21) Appl. No.: 15/952,556

(22) Filed: Apr. 13, 2018

(65) Prior Publication Data
US 2019/0316313 A1  Oct. 17, 2019

(51) Int. Cl.
*E02D 33/00* (2006.01)
*H02K 33/14* (2006.01)
*G01M 7/08* (2006.01)

(52) U.S. Cl.
CPC .............. *E02D 33/00* (2013.01); *G01M 7/08* (2013.01); *H02K 33/14* (2013.01)

(58) Field of Classification Search
CPC .......... E02D 33/00; G01M 7/08; H02K 33/14
See application file for complete search history.

(56) References Cited

U.S. PATENT DOCUMENTS

| | | | | |
|---|---|---|---|---|
| 5,257,879 A | * | 11/1993 | Veronelli | E02D 7/28 173/81 |
| 6,253,789 B1 | * | 7/2001 | Krimmer | F02M 25/0836 137/550 |
| 2008/0236842 A1 | * | 10/2008 | Bhavsar | E21B 41/02 166/381 |
| 2013/0147426 A1 | * | 6/2013 | Misono | B60R 16/03 320/108 |
| 2015/0367492 A1 | * | 12/2015 | Lindell | B25D 17/24 173/211 |
| 2018/0170726 A1 | * | 6/2018 | August | B66D 1/485 |

* cited by examiner

*Primary Examiner* — Herbert K Roberts
*Assistant Examiner* — John M Royston
(74) *Attorney, Agent, or Firm* — ZANIP

(57) ABSTRACT

A new hammering system with electromagnetic power for dynamic pile testing. The basic working principle of the hammering system is as follows: when an internal coil is energized, a magnetic force is generated to attract tightly, via a magnetic conduction panel, an adaptive weight hammer disposed in contact with the surface of the panel; when the internal coil is de-energized, demagnetization occurs, and the weight hammer falls instantaneously to impact the pile top, thereby achieving the effects of a stable weight hammer and quick attraction and falling of the hammer. A clamping scale is arranged inside an adjustment section of a guide frame. A falling height of the weight hammer may be selected arbitrarily.

5 Claims, 4 Drawing Sheets

HAMMERING SYSTEM WITH ELECTROMAGNETIC POWER FOR DYNAMIC PILE TESTING

FIELD

The present invention belongs to high-strain dynamic tests of foundation piles and relates to a key field test hardware device.

BACKGROUND

The test of the bearing capacity of a single pile is essential for foundation engineering. The reliability of the test results directly affects the safety of the superstructure. The high strain dynamic testing of piles is an advanced technology of pile bearing capacity testing and has outstanding advantages such as fast testing, flexible sampling, low cost, and rich testing parameters compared with a traditional static load test.

The accuracy of the high strain dynamic testing of pile depends on the data quality of time curves of measured force and velocity impedance, but the measured data quality is greatly affected by the hammering effect of a weight hammer. The high strain dynamic testing of piles requires the following conditions: the starting time, phases and impact pulse amplitudes of a measured force curve and a velocity impedance curve should be consistent, and meanwhile, the pulse widths and amplitudes of two individual force curves and two single velocity impedance curves should also be consistent, such that subsequent information on soil resistance and pile impedance can reflect actual pile-soil properties, and the calculated bearing capacity results can be accurate and reliable. Apparently, it is difficult to meet the above requirements, so a high demand on the hammering effect of the weight hammer is proposed, i.e., the hammer must impact the pile top quickly and smoothly in a centered manner. However, in practical engineering, the hammer falls seriously eccentrically and the consistency of time curves of force and velocity impedance is poor due to an unreasonable hammering hardware system, resulting in inaccurate measurement data and wrong test results and causing serious hidden troubles for engineering. The main problems in hammering at present are the followings.

A detacher is unreasonable. At present, mechanical partially-expanded detachment is commonly used, that is, a crossbeam is arranged above a lock latch (engaged with the weight hammer) and tends to extend toward one direction. When the hammer falls, the detacher is connected by means of a crane wire rope, and the lock latch is stretched out by manually hitting the end of the crossbeam hard, so the weight hammer falls to impact the pile top. Deviation has already happened in this method when the crossbeam is hit. This is because of the deviation effect during the hitting of the crossbeam and the swaying effect of the flexible wire rope, such that a plurality of eccentric forces is applied to the weight hammer when the lock latch is stretched out. The weight hammer sways back and forth during the falling process and thus fails to be centered, thereby deviating from the center of the test pile and eccentrically impacting the pile top. The pile top is often under pressure on one side and under tension on the other side, or even cracks. Therefore, the measured force curve and the velocity impedance curve cannot meet the test requirements. So, it is necessary to develop a detacher with a novel principle.

There is no guide device, or the guide device is unreasonable. During tests, the guide device is often not used, or a simple gantry guide frame is used only, and there is no leveling device to ensure that the hammer falls in a centered manner.

The weight hammer is unbalanced and not adaptive to the detacher. The weight hammer for tests lacks leveling, and the bottom of the weight hammer cannot smoothly contact the plane of the pile top with its total cross-section after the weight hammer falls. There is a need to develop a novel weight hammer that is leveled and matched with the detacher. Different weights and different sizes of weight hammers should be adaptive to different detachers. Ideally, each weight hammer should be adaptive to a respective detacher.

There is no hammer cushion device. Since no hammer cushion is used during tests, a large amount of high-frequency interference is generated when the heavy weight falls to the pile top, thereby causing a distortion of the force and velocity impedance curves and resulting in troubles for data processing and analysis.

Therefore, it is very necessary to invent a novel hammering system.

SUMMARY

In order to solve the above technical problems, the present invention provides a hammering system with electromagnetic power for dynamic pile testing, an adaptive weight hammer, a retractable and levelable guide frame, and a special hammer cushion device, etc., to form a whole set of brand-new dedicated hammering system for high strain dynamic testing of piles.

There is provided a hammering system with electromagnetic power for dynamic pile testing, the system comprising an electromagnetic detacher. When an internal coil of the electromagnetic detacher is energized, a magnetic force is generated to attract tightly, via a magnetic conduction panel, an adaptive weight hammer disposed in contact with the surface of the panel; when the internal coil is de-energized, demagnetization occurs, and the weight hammer falls instantaneously to impact the pile top as the magnetic force disappears; when the internal coil is energized again, a magnetic force is generated to attract the weight hammer again for performing next hammering.

The electromagnetic detacher is a box-like component, which consists of a bottom shell, an iron core, a coil, a panel, a cable connection box, a current rectification control cabinet, a cable drum and a wireless remote controller and is powered by a direct current; the hammering system is designed as a cylindrical box in which a coil of a corresponding number of turns is wound according to an attraction force requirement.

In a pile dynamic testing process, the electromagnetic detacher is placed on the top surface of the weight hammer by using a crane, and energized to attract the weight hammer and lift it to a desired height; then, the electromagnetic detacher is de-energized, and demagnetization occurs to release the weight hammer; since the de-energization and the hammer falling are completed instantaneously, the weight hammer falls freely to the pile top without any external force.

A retractable guide frame is of a special steel structure consisting of a base section and an adjustment section; the base section has trapezoidal side surfaces and square top and bottom surfaces; a side length of the bottom surface of the base section is 4 m; the adjustment section has rectangular side surfaces and square top and bottom surfaces; the adjustment section is sleeved with the base section.

A special hammer cushion is of a sheet structure consisting of a steel plate, rubber, and an air bag and has a specification the same as that of the bottom surface of the weight hammer.

The hammering system generates a magnetic force or undergoes demagnetization through energization or de-energization, thereby achieving the effects of a stable weight hammer and quick attraction and falling of the hammer.

Compared with the prior art, the present invention has the following beneficial effects.

According to the present invention, the hammering is performed stably and rapidly in a centered manner, and the measured data quality is very high. In the system, the hammering system is specially designed so that the falling process of the hammer is not interfered by any external force, and the entire falling process of the hammer is completely free-falling movement. At the same time, the guide device is specially designed in the system. The center of the guide frame is consistent with the center of a test pile during a test in order to guide and control the falling process of the hammer in a vertical direction. In this way, it is guaranteed that the weight hammer impacts the pile top stably and rapidly in a centered manner. As the tested pile is displaced entirely, a high consistency of important parameters, such as the impact starting time and amplitudes of a measured force curve, a velocity impedance curve and a force and velocity curve of each channel in a dynamic testing process are also ensured, thereby greatly improving the data quality and the reliability of test results.

The hammering system is free of external force interference. The detacher in the present invention is completely different from a mechanical or hydraulic detacher that is now commonly used. First of all, the geometric size and attraction force of electromagnetic detacher are fit for the adaptive weight hammer, and the two parts can cooperate together. Secondly, the hammering system attracts or releases the weight hammer instantaneously through charging or discharging, without being interfered from any external force, thereby ensuring the stability of the falling process of the hammer.

The retractable and levelable guide frame is practical, convenient and high in adaptability. The guide frame in the present invention is a special device consisting of a base section and an adjustment section. When an elevation of the pile top has a change compared to common cases, the adjustment section may retract freely to adapt to the site conditions of different pile top elevations. A clamping scale is arranged inside the adjustment section at intervals of 10 cm. The falling distance of the weight hammer may be selected arbitrarily. In addition, support leg leveling devices are arranged at four corners of the bottom of the guide frame respectively to adapt to the case where a site is uneven. When no leveling is required, the support leg devices are fixed inside the guide frame for easy transportation and protection; if leveling is required, the support legs in all directions may be pulled out conveniently and individually adjusted to ultimately ensure that the four legs of the guide frame are located on the same level, such that the guide frame is vertical and stable as a whole. Thus, the guide frame is very practical.

The special hammer cushion whose thickness is adjustable prolongs the action time and protects the pile top. The special hammer cushion is made of hard rubber in which a steel skeleton is arranged, and has a square sheet structure. A varying amount of the hammer cushions may be placed on the pile top as required during a test. The thickness of the hammer pad may be adjusted conveniently. The steel skeleton in the special hammer cushion may serve as a spring to transfer a force, and the rubber and the air bag play a role in buffering and prolonging the hammering action. In this way, the impact force of the weight hammer may be transferred to the pile top, such that the impact time may be extended and the soil resistance is fully mobilized. At the same time, the pile top may also be protected from impact damages.

DETAILED DESCRIPTION

Figure 1:
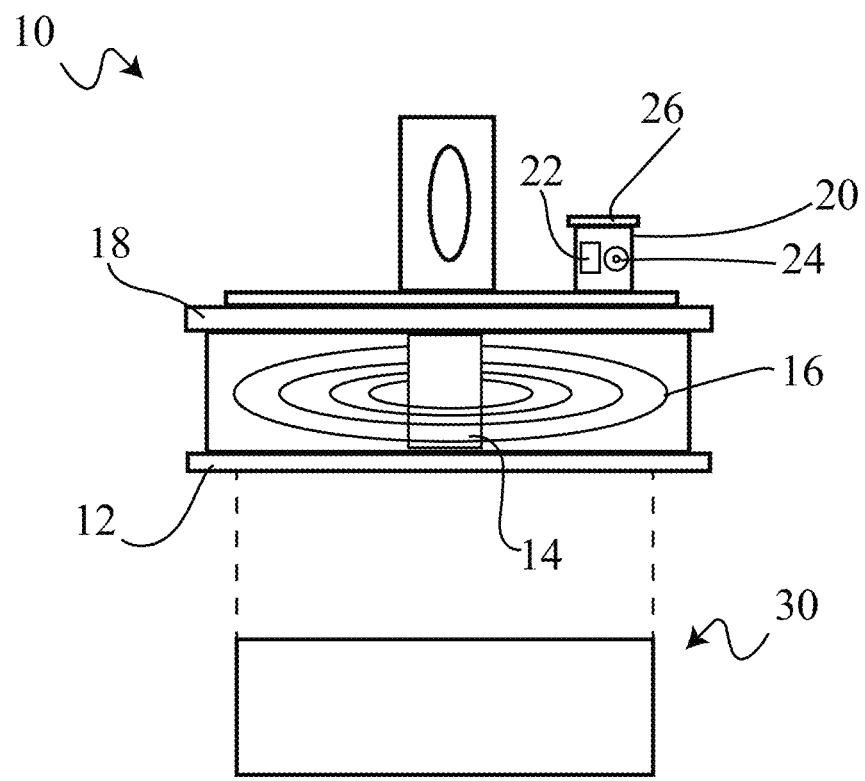
FIG. 1 is a longitudinal sectional view of a hammering system with electromagnetic power for dynamic pile testing.
Figure 2:
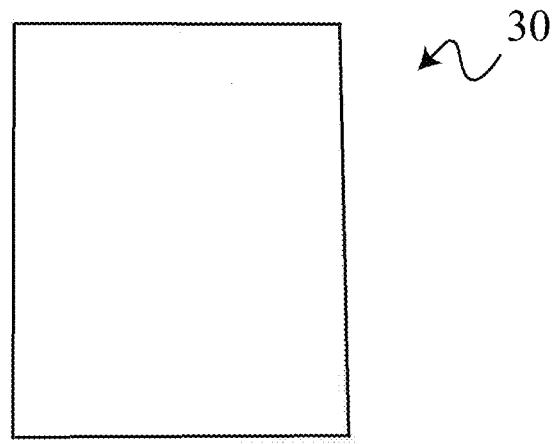
FIG. 2 is a structural view of an adaptive weight hammer.
Figure 3:
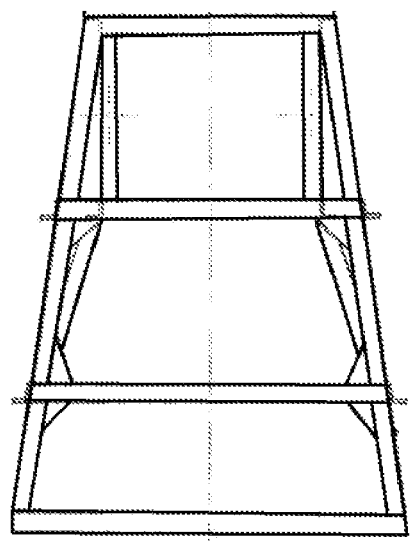
FIG. 3 is a longitudinal sectional view of a base section of a retractable and levelable guide frame.
Figure 4:
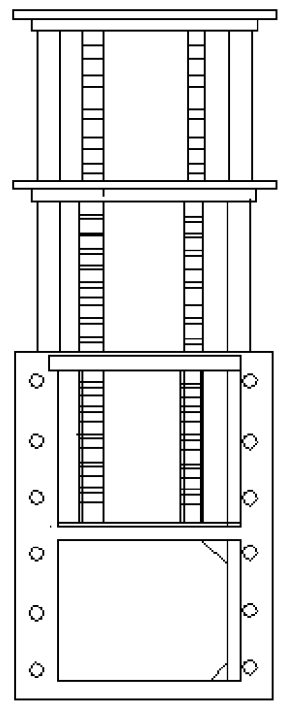
FIG. 4 is a longitudinal sectional view of an adjustment section of the retractable and levelable guide frame.
Figure 5:
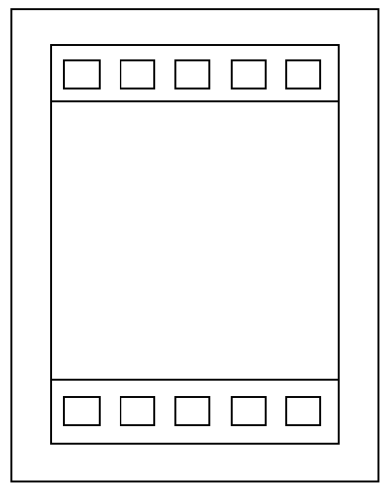
FIG. 5 is an external view of a clamping scale.
Figure 6:
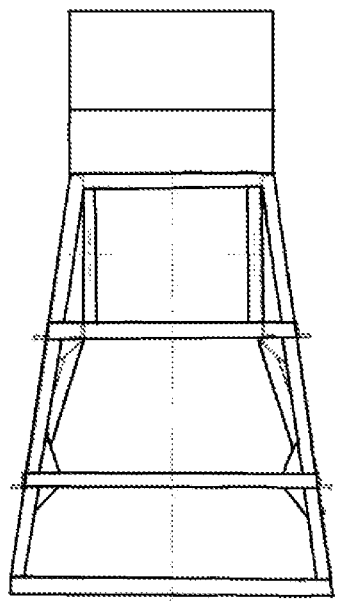
FIG. 6 is an overall external view of the hammering system according to the present invention.
Figure 7:
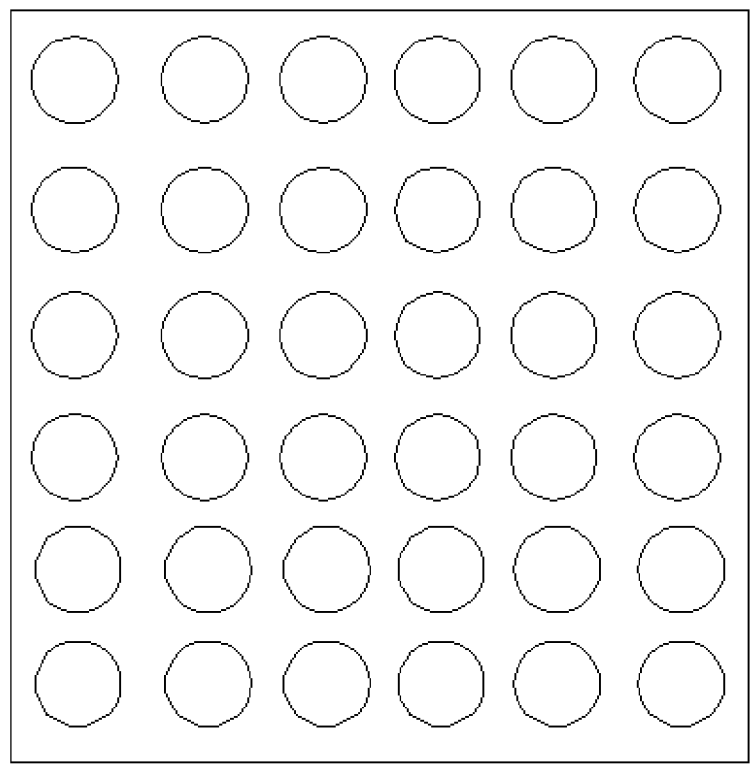
FIG. 7 is an external view of a special hammer cushion of the present invention.

The present invention will be further described below in combination with the drawings.

Embodiment

As shown in drawings, the operating steps of an electromagnetic hammering system are as follows. When an internal coil is energized, a magnetic force is generated to attract tightly, via a magnetic conduction panel, an adaptive weight hammer disposed in contact with the surface of the panel. When the internal coil is de-energized, demagnetization occurs, and the weight hammer falls instantaneously as the magnetic force disappears.

When the internal coil is energized again, a magnetic force is generated to attract the weight hammer again for performing next hammering. The electromagnetic detacher 10 is a box-like component, which consists of a bottom shell 12, an iron core 14, a coil 16, a panel 18, a cable connection box 20, a current rectification control cabinet 22, a cable drum 24 and a wireless remote controller 26 and is powered by a direct current, thereby achieving stable and powerful attraction and low remanence. In consideration of the weight and shape of the hammer as well as uniform and stable attraction, the electromagnetic detacher is designed as a cylindrical box in which a coil of a corresponding number of turns is wound according to an attraction force requirement. The electromagnetic detacher is placed on the top surface of the weight hammer 30 by using a crane, and energized to attract the weight hammer and lift it to a desired height. Then, the electromagnetic detacher is de-energized, and demagnetization occurs to release the weight hammer. Since the de-energization and the hammer falling are completed instantaneously, the weight hammer falls freely to the pile top without any external force, and is stable and centered.

A retractable guide frame in the present invention is of a special steel structure consisting of a base section and an adjustment section. The base section has trapezoidal side surfaces and square top and bottom surfaces. A side length of the bottom surface of the base section is 4 m. In addition, the steel is widened and thickened to meet the supporting force requirements. The base section consists of three sections, and the height of each section may be determined according to parameters such as hammer weight and pile diameter. A ladder is welded to one side of the base section to facilitate climbing when needed. The adjustment section has rectangular side surfaces and square top and bottom surfaces. The adjustment section is sleeved with the base section. When an elevation of the pile top is much higher than the ground, the adjustment section may be lifted to adapt to the requirements on a falling distance. On the contrary, when the elevation of the pile top is at a depth below the ground, the adjustment section may be lowered. A clamping scale is arranged inside the adjustment section at intervals of 10 cm to facilitate control of the falling distance of the weight hammer. In addition, support leg leveling devices are arranged at four corners of the bottom surface of the base section respectively to adapt to the case where a site is uneven. When no leveling is required, the support leg devices are fixed inside the guide frame for easy transportation and protection. If leveling is required, the support legs in all directions may be pulled out conveniently and individually adjusted to ultimately ensure that the four legs of the guide frame are located on the same level, such that the guide stable is vertical and stable as a whole. By means of such a retractable and levelable design, the hammer may be guided and controlled to fall stably in a centered manner, so as to adapt to different working conditions through stretching and retracting the adjustment section and leveling the support legs, thereby achieving high adaptability.

A special hammer cushion is of a sheet structure consisting of a steel plate, rubber, and an air bag and has a specification the same as that of the bottom surface of the weight hammer.

The hammering system generates a magnetic force or undergoes demagnetization through energization or de-energization, thereby achieving the effects of a stable weight hammer and quick attraction and falling of the hammer.

During operation, two strain sensors and two acceleration sensors are installed symmetrically at a position about two times the pile diameter under the pile top, and are connected with a main cable. The main cable is connected with an data acquisition main unit. When everything is ready, the main unit can wait for the impact from the falling hammer and collects data.

A hammer head is lifted and placed on the top of the tested pile by using a crane to ensure that the center of gravity of the weight hammer is consistent with the center of the pile.

The hammering system is lifted and placed on the top surface of the weight hammer by using the crane.

The retractable and levelable guide frame is lifted by using the crane and nested to the outside of the hammering system and the weight hammer which are connected. The base section is kept stable and horizontal. When the site is uneven, the support legs at the bottom are pulled out and leveled. After the guide frame is well fixed, a main hook of the crane extends to a lifting lug of the hammering system and waits for energization to attract the weight hammer. A cable drum is connected to a power supply. An alternating current is converted to a direct current through a current rectification control cabinet, such that the electromagnetic detacher is energized to attract the weight hammer. The weight hammer is lifted to a specified clamping scale position, i.e., the weight hammer is lifted to a desired falling height.

After de-energization and demagnetization, the weight hammer falls stably to the pile top, and force and velocity impedance time curves are acquired.

After signals are collected, the hammering system is lowered to the top surface of the weight hammer by using the crane and then energized to generate a magnetic force to attract the weight hammer. The above steps are repeated to perform a next impact action and continuously collect data.

At last, after the data quality meets the requirements, the test is ended.

Those solutions that achieve the above technical effects by use of the technical solutions described in the present invention, or similar technical solutions designed by those skilled in the art under the inspiration of the technical solutions of the present invention all shall fall into the protection scope of the present invention.

What is claimed is:

1. A hammering system with electromagnetic power for dynamic pile testing, comprising:
    an electromagnetic detacher, wherein when an internal coil of the electromagnetic detacher is energized, a magnetic force is generated to attract tightly, via a magnetic conduction panel, an adaptive weight hammer disposed in contact with the surface of the panel;
    when the internal coil is de-energized, demagnetization occurs, and the weight hammer falls instantaneously to impact a pile top as the magnetic force disappears;
    when the internal coil is energized again, a magnetic force is generated to attract the weight hammer again for performing next hammering;
    the electromagnetic detacher is a box-like component, which comprises a bottom shell, an iron core, a coil, a panel, a cable connection box, a current rectification control cabinet, a cable drum connectable to a power supply, and a wireless remote controller, and is powered by a direct current;
    the hammering system comprises a cylindrical box in which a coil of a corresponding number of turns is wound according to an attraction force requirement; and
    wherein, in dynamic pile testing, the electromagnetic detacher is placed on the top surface of the weight hammer by using a crane, and energized to attract the weight hammer and lift it to a desired height; then, the electromagnetic detacher is de-energized, and demagnetization occurs to release the weight hammer; since the de-energization and the hammer falling are completed instantaneously, the weight hammer falls freely to the pile top without any external force.

2. The hammering system with electromagnetic power for dynamic pile testing according to claim 1, wherein a retractable guide frame is of a steel structure comprising a base section and an adjustment section; the base section has trapezoidal side surfaces and square top and bottom surfaces; a side length of the bottom surface of the base section is 4 m;
    the adjustment section has rectangular side surfaces and square top and bottom surfaces; and the adjustment section is sleeved with the base section.

3. The hammering system with electromagnetic power for dynamic pile testing according to claim 1, wherein a hammer cushion is of a sheet structure comprising a steel plate, rubber, and an air bag, and has a specification the same as that of the bottom surface of the weight hammer.

4. The hammering system with electromagnetic power for dynamic pile testing according to claim 1, wherein the hammering system generates a magnetic force or undergoes demagnetization through energization or de-energization, thereby achieving the effects of a stable weight hammer and attraction and falling of the hammer.

5. The hammering system with electromagnetic power for dynamic pile testing according to claim 1, wherein a retractable guide frame is of a steel structure comprising a base section and an adjustment section; support legs and support leg leveling devices are arranged at four corners of the bottom of the guide frame; the support leg leveling devices being individually adjustable such that the support legs are located on the same level such that the guide frame is vertical and stable.

\* \* \* \* \*